Dec. 26, 1939.  C. EHRET  2,184,664
ANTISKID DEVICE FOR MOTOR VEHICLES
Filed Nov. 30, 1937
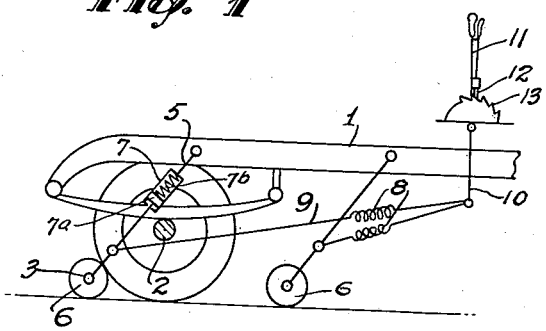
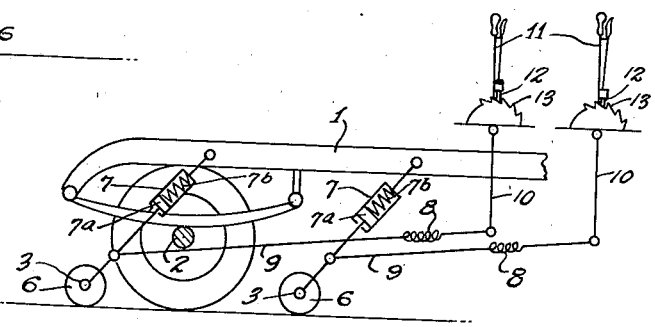
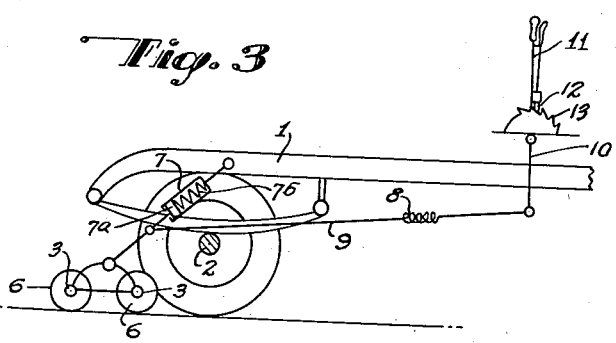
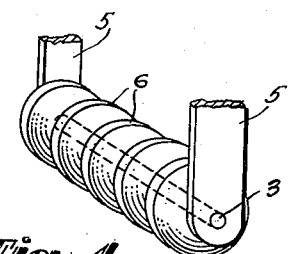
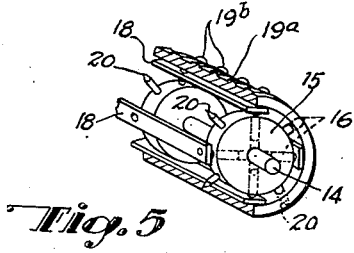
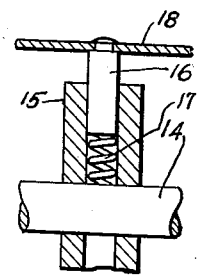
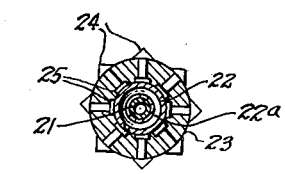
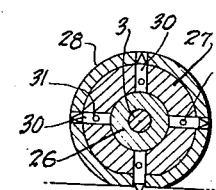
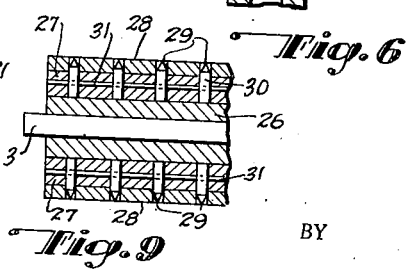
INVENTOR.
Clement Ehret
BY Cornelius Zabriskie
ATTORNEY.

Patented Dec. 26, 1939

2,184,664

UNITED STATES PATENT OFFICE 2,184,664

ANTISKID DEVICE FOR MOTOR VEHICLES

Clement Ehret, White Plains, N. Y.

Application November 30, 1937, Serial No. 177,192

10 Claims. (Cl. 188—5)

This invention is an anti-skid device for motor vehicles of all kinds and is so constituted that it will not in any way detract from the normal operations of the vehicle, but will be operable at the will of the driver in the event of emergency to arrest skidding and to assist in the stopping of a car.

The invention, generally speaking, consists in providing, on the under side of the car, one or more frictional devices so constituted that, when brought into engagement with the road or pavement, they will arrest lateral movement in a smooth and easy manner and without undesirable shock or jar, while, under all ordinary conditions, such devices will remain free of the road surface, so as not to interfere with the ordinary or conventional operation of the car.

More specifically, the invention comprises one or more road engaging devices which are preferably supported on hangers pivotally mounted on the under side of the chassis and normally retracted into a position wherein they are spaced an appreciable distance above the road surface, so as not to interfere with the ordinary road clearance. The hangers are, however, operatively connected to suitable manually controlled or manually operable means, such as a lever, by which they are adapted, upon the event of emergency, to be brought into contact with the road surface. The road engaging devices may be of a rigid or yielding nature, but are preferably of a resilient character, so as to grip the road surface and tend to flatten out thereagainst and conform therewith in order to provide maximum surface contact with the road.

The following detailed description sets forth numerous features of the present invention, and various illustrative means whereby the same may be carried out. These features, additional to those which have been described, will be apparent from such description and claims, when read in conjunction with the accompanying drawing.

The accompanying drawing illustrates different practical embodiments of the invention, but the constructions therein shown, are to be understood as illustrative, only, and not as defining the limits of the invention.

Figures 1, 2 and 3 diagrammatically show different embodiments of the present invention associated with the motor vehicle.

Figures 4–9 show modified forms of road engaging devices in section.

Referring first to Figures 1, 2 and 3 it will be noted that in this figure, I have illustrated the chassis of a car, the rear axle housing being indicated at 2. In adapting the invention to a car, I pivotally suspend from the chassis a pair of hangers 5 which support rollers 6. Each hanger 5 comprises a cylinder 7 and a plunger 7a, the latter of which acts against a spring 7b within the cylinder. The cylinders are pivoted to the chassis frame and the plungers carry the roller 6 on a suitable transverse shaft or shafts 3. The advantage of this structure is that the hangers are longitudinally yielding to permit the rollers to better conform to the contour of the road surface and to compensate for variations therein. Furthermore the springs 7b cushion the rollers and permit them to ride over obstructions in the road without damage to the apparatus. The springs 7b will also cushion the rollers in the event of backward movement of the car, so that if it meets an obstruction when so moved, the parts will yield to compensate therefor. The hangers are connected by a shaft 3 secured to the work end 10 of a manually operable lever 11 by an interposed link 9. The lever 11 is similar to the conventional emergency brake lever and is provided with a pawl 12 operating over a ratchet quadrant 13. Under normal conditions, the lever is in a position to hold the rollers 6 out of engagement with the road surface. In the event of a skid, however, the lever 11 may be operated to draw the rollers down into engagement with the road surface and produce a drag which will not only tend to brake the forward movement of the car but will also arrest lateral movement of the rear end of the car. The rollers are here shown as illustrative of road engaging devices which may partake of various forms, as will hereinafter be described in detail.

The structure which I have described may be bifurcated at a plurality of points in the length of the chassis as shown in Figure 1 where two rollers and associated hangers are shown connected to a single operating lever 11 or each set of rollers and hangers can be operated from independent levers as shown in Figure 2. In Figure 3 two rollers positioned one in advance of the other are mounted on the same hangers and are simultaneously moved by a single lever 11 into and out of contact with the road. It should also be understood that rollers 6 may be of any width so as to extend over practically the full length of the chassis between the wheels or a number of such rollers may be positioned side by side on the same shaft as shown, for example, in Figure 4 hereinafter more fully described.

If desired the links 9 which operate the rollers 6 may be provided therein with cushioning elements 8, so that jars or shocks to which the road engaging element may be subjected are not unduly transmitted to the manually operable lever 11.

I have hereinbefore referred to the road engaging device as a roller. I wish it understood, however, that these road engaging devices may vary within wide limits and in Figures 4-19, I have shown different forms as illustrative thereof.

For example, in Figure 4, the hangers 5, carry a transverse shaft 3 on which are a number of spaced apart rollers, wheels or disks 6 which may be solid, hollow or pneumatic and be of metal, rubber or a combination thereof and may have smooth surfaces or hob-nailed, studded or tire-like surfaces. Such members may be made to rotate freely on the shaft or they may have frictional engagement with the hangers or with one another as may be desired. They may have hollow ground peripheries, so that their edges are relatively sharp, whereby they will act, after the manner of a skate on ice, to arrest lateral movement. This figure is illustrative of the utilization of a plurality of disks, wheels or rollers and this construction may vary within wide limits depending upon conditions. The shaft 3 may be made readily removable and this construction readily permits changes to various types of disks, wheels, rollers, or other road engaging units to meet specific conditions existing at different times.

In Figures 5 and 6 a somewhat different arrangement is shown. Here a shaft 14, corresponding to the shaft 3, is provided thereon with disks 15 of metal or other suitable material. These disks are spaced apart and are provided with radial holes, into each of which extends a piston 16, operable against a spring 17. The outer ends of the pistons are secured to resilient strips 18 of sheet metal and this whole construction is enclosed within a rubber sleeve or tire 19, which is thus resiliently supported from the shaft 14. The outer periphery of the sleeve may be smooth, but is preferably provided with projections 19a, such as are found in conventional automobile tire treads. Furthermore, this sleeve may be provided with metal studs, hobnails or the like 19b.

As further shown in Figure 5, each of the disks 15 has fixed thereto radial pins 20 which extend into alined openings in the sleeve 19 and preferably have sharpened or pointed ends, so that when the device is forced against the road surface under variable pressures at the will of the operator and flattened out to a greater or lesser extent, depending upon the pressure applied, the pins 20 will be caused to project to a greater or lesser extent beyond the outer surface of the sleeve 19 and grip the road surface in such a way as to preclude skidding. The extent to which these pins will extend will of course depend upon the degree to which the sleeve is flattened out against the pavement under the pressure applied thereto, so that this operation can be effectually controlled by the driver of the vehicle.

In Figure 7, a road engaging device is shown as comprising a metal sleeve 21 embraced by a relatively soft rubber core 22 shown in this figure as having a hollow pneumatic chamber 22a and about this rubber core is a harder rubber sleeve 23. The sleeve 23 carries metal studs 24 having heads externally of the sleeve adapted to grip the road in a non-skid manner. The inner ends of the studs have enlargements 25 bearing against the soft rubber core, so that there is ample resiliency in this construction and at the same time the structure is able to afford an adequate non-skid grip on the road. The structure of Figure 7 may be mounted in any suitable type of hanger.

In the constructions of Figures 8 and 9, the shaft 3 which is supported in the hangers is surrounded by a core 26 of hard rubber, metal or other resisting material which is embraced by a relatively soft cushioning sleeve such as sponge rubber or the like 27 and this is covered by the outside sleeve or tread 28 of leather, rubber or other flexible material. Radial pockets 29 are formed in the sleeves 27 and 28 and into each of these pockets is received a pin or plunger 30 which is preferably of metal, although other suitable hard substances may be employed. The pins 30 are preferably pointed at their outer ends and are of such length that they are ordinarily within the confines of the openings in which they are placed. They are arranged in rows longitudinally of the roller construction described and are held in place by resilient rods or wires 31 which pass longitudinally through the cushioning sleeve 27 and through alined holes in the several pins. These wires 31 may be withdrawn to replace worn pins when desired. By interposing the soft yielding sleeve 27 between the tread 28 and the core 26, the tread will be permitted to flatten out to a greater or lesser extent against the road surface as the device is forced thereagainst by the operator and as the roller construction flattens the pins will project to positively grip the road surface in a manner similar to that described in connection with the pins 20 of Figure 5.

It will be apparent from the foregoing description of the several road engaging devices, that they may partake of widely different forms. It is desirable that those devices, wherein appreciable surface contact is necessary to give the desired braking function, should be sufficiently resilient or yielding to flatten out perceptibly against a road for the purpose stated. For this reason said devices preferably embody or constitute resilient elements. In practice, the resilient element may be the device itself or a resilient core, or a combination thereof, or the device may be made pneumatic. Of the rollers used, their surfaces may be smooth or they may be provided with metal studs secured to the device in any appropriate way, or the surfaces of the device may be made like a tire tread and embody within the surface of the device projections of metal, rubber or other material as may be desired under the conditions.

In certain figures of the drawing, the hangers are shown as supported directly on the chassis frame. I wish it understood in this connection that the hangers may be supported on any appropriate part of the vehicle or on the under side of the running boards and at any point in the length of the chassis.

I have hereinbefore set forth in the various figures of the drawing different forms of detailed construction in connection with specific assemblies. I wish it understood, however, that I may employ some features of one construction with other features of another construction and that these features may be used interchangeably in different combinations than shown and in different relations as may be prescribed by particular requirements or desired by the manufacturer. For these reasons it is to be understood that the parts shown in the drawing may be interchanged or re-assembled in other combinations than that shown without departing from this invention so long as the fundamental concept of a braking device, operable as described, is embodied.

The foregoing description sets forth the invention in its preferred practical form, but the invention is to be understood as commensurate with the appended claims.

Having thus fully described the invention, what I claim as new and desire to secure by Letters Patent is:

1. A motor vehicle in combination with an anti-skid device mounted on the vehicle and movable at the will of the operator into and out of contact with the road, said anti-skid device comprising at least one roller of sufficient inherent resiliency to permit flattening of the roller against the road surface when forced into contact therewith, and relatively hard road gripping projections carried by the resilient roller, said projections having fixed relations with respect to the axis of the roller to be projected to a greater extent beyond the surface of the roller as the roller is flattened against the road surface.

2. A motor vehicle in combination with an anti-skid device mounted on the vehicle and movable at the will of the operator into and out of contact with the road, said anti-skid device comprising at least one roller of sufficient inherent resiliency to permit flattening of the roller against the road surface when forced into contact therewith, and relatively hard road gripping projections carried by the resilient roller and non-yieldably supported thereby.

3. A motor vehicle in combination with an anti-skid device mounted thereon and movable at the will of the operator into contact with the road, said anti-skid device comprising at least one roller having a relatively non-yielding core, a resilient sleeve about said core adapted to yield with respect to the core when the roller is forced into contact with the road surface, and relatively hard studs carried by the core and projecting through openings in the sleeve to be projected beyond the outer surface of the roller when said roller yields against the road surface.

4. A motor vehicle in combination with an anti-skid device mounted thereon and movable at the will of the operator into contact with the road, said anti-skid device comprising at least one roller having a relatively non-yielding core, a resilient sleeve about the core, and a tread embracing said sleeve, said sleeve and tread having therein radial apertures, and hard studs positioned normally within said apertures and substantially non-yieldably backed up by the core against longitudinal retraction, whereby the flattening of the roller against the road surface will cause the studs to be projected beyond the surface of the tread of said roller.

5. A motor vehicle in combination with an anti-skid device mounted thereon and movable at the will of the operator into contact with the road, said anti-skid device comprising at least one roller having a relatively non-yielding core, a resilient tread about said core adapted to yield with respect to the core when the roller is forced into contact with the road surface, and relatively hard studs supported on the core against retraction and projecting through apertures beyond the outer surfaces of the tread to increasing distances as the tread increasingly yields while in contact with the road surface.

6. A motor vehicle in combination with an anti-skid device mounted on the vehicle and movable at the will of the operator into and out of contact with the road, said anti-skid device comprising at least one roller having a substantially rigid core, a resilient tread embracing said core, and sharpened studs rigid with the core and projecting through openings in the tread to be projected beyond the outer surface of the tread as the latter is forced against the road surface.

7. A motor vehicle in combintion with an anti-skid device mounted thereon and movable at the will of the operator into contact with the road, said anti-skid device comprising at least one roller having a relatively yieldable core, a tread surrounding said core, and hard studs carried by the tread, said core being sufficiently yielding to permit the tread to flatten against the road surface as the roller is forced into engagement therewith.

8. A motor vehicle in combination with an anti-skid device mounted on the vehicle and movable at the will of the operator into and out of contact with the road, said anti-skid device comprising at least one roller having a hard core, metal studs bearing against the core at their inner ends, a soft rubber sleeve embracing said core, and tread embracing said sleeve, said sleeve and tread being apertured for the studs which normally terminate substantially at the outer surface of the tread, but being adapted to project appreciably beyond said surface when the tread is flattened under compression against the road surface.

9. A motor vehicle in combination with an anti-skid device mounted thereon and movable at the will of the operator into and out of contact with the road, said anti-skid device comprising at least one roller having a core, hard studs carried by the core and rigidly supported with respect thereto, a tread surrounding the core and resiliently mounted with respect thereto and provided with apertures through which said studs extend to be projected to a greater or lesser extent beyond the surface of the tread as the tread yields with respect to the core.

10. An anti-skid device for motor vehicles, movable into and out of engagement with the road surface, comprising an annular resiliently yieldable tread member, and an axially supported core therein and embraced thereby, said core having sufficient inherent resiliency to permit the flattening of both the tread and core when said tread is forced into egagement with the road surface.

CLEMENT EHRET.